United States Patent [19]

Polacek et al.

[11] 3,938,331

[45] Feb. 17, 1976

[54] HYDROSTATIC SERVOMECHANISM WITH ARTIFICIAL FEEDBACK

[75] Inventors: Bohumil Polacek, Brno, Czechoslovakia; Semen Marsan, Moscow, U.S.S.R.

[73] Assignee: Zavody tazkeho strojarstva, generalne riaditelstvo, Martin, Martin, Czechoslovakia

[22] Filed: Aug. 20, 1974

[21] Appl. No.: 498,918

[30] Foreign Application Priority Data

Aug. 20, 1973 Czechoslovakia .................. 5831-73

[52] U.S. Cl. .................................... 60/385; 60/386
[51] Int. Cl.² ...................... F15B 9/02; F15B 13/16
[58] Field of Search ............ 60/325, 384, 385, 386, 60/387; 180/79.2 R

[56] References Cited
UNITED STATES PATENTS 2,954,756  10/1960  Donner et al. ........................ 60/384
3,765,181  10/1973  Lang et al. ............................ 60/386

*Primary Examiner*—Edgar W. Geoghegan

[57] ABSTRACT

A hydrostatic servomechanism adapted for controlling the direction of vehicles and selfpropelled machines. The servomechanism has a power circuit including a servopump, a distributor with reset mechanism, and a servomotor and a control circuit with a measuring pump connected through the control branches to the reset mechanism of the distributor and actuated by means of a command element, for example a vehicle steering wheel. The invention provides a simple reliable servomechanism with an artificial feedback simulator, non-sensitive to various harmful effects, providing a relatively stable and easily selectable gear ratio between the input and output parts of the servomechanism. The feedback simulator comprises a flow meter, a power circuit, and a controllable throttle means mechanically connected to the flow meter, the feedback simulator being incorporated between the control branches of the control circuit.

7 Claims, 4 Drawing Figures

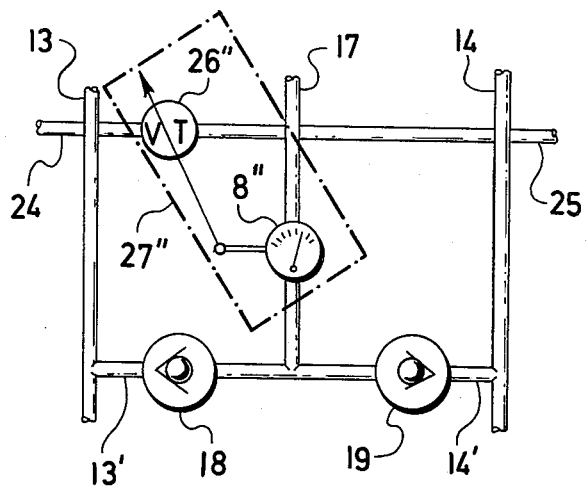
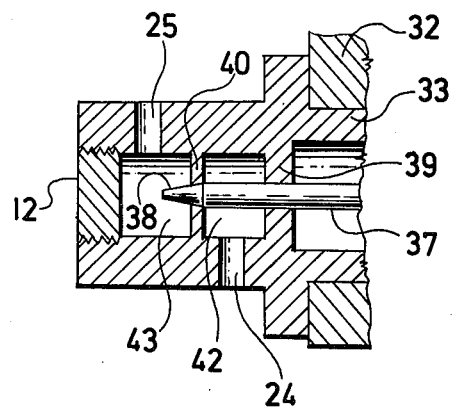
FIG. 2
FIG. 4
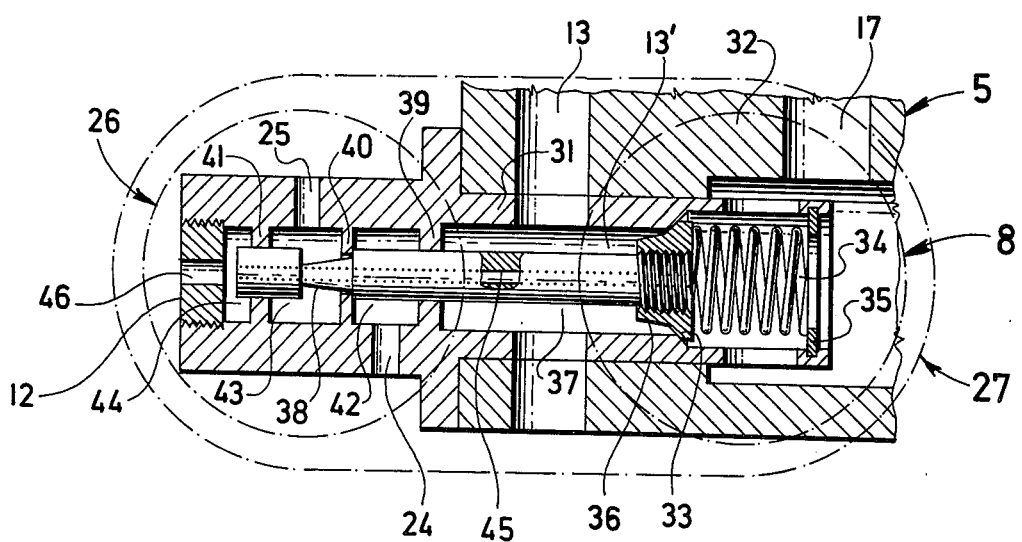
FIG. 3

HYDROSTATIC SERVOMECHANISM WITH ARTIFICIAL FEEDBACK

This invention concerns a hydrostatic servomechanism, namely for controlling the direction of vehicles and selfpropelled machines, consisting of a power circuit comprising a servopump, a distributor and a servomotor and a control circuit with a measuring pump connected through the control branches to the reset mechanism of the distributor and actuated by means of a command element – for example a vehicle steering wheel.

Servomechanism comprising a positioning feedback are complicated since they require mechanical, hydraulic or other connections between the input and the output of the servomechanism. These servomechansms also tend to be unstable in function, namely when operating with large inertia masses and large liquid volumes in the servomotor and the supply branches.

Beside servomechanisms with a positioning feedback, there are servomechanisms with artificial feedback, these being less dependent on the equipment on which they are used as compared with the foregoing mechanisms. Some of these mechanisms have within the power circuit a screen and between the branches of the control circuit one or several throttle means. The opening of these throttle means by a relatively small pressure drop caused by the liquid flow through the screen within the power circuit secures proportionality between the displacement of the input and the output element of the servomechanism.

Other servomechanisms with artificial feedback have within the power circuit, besides the servopump, the servomotor and the distributor, a flow stabilizer, and the controlling branches are interconnected by a small size opening. The distributor and the flow stabilizer are so made that the liquid flow through the distributor is constant, independent of the fluctuating amount of the liquid supplied by the servopump and of the variability of the servomotor loading.

The proportionality of the displacements of the input element and the output element is such that the flow through the small size opening between the control branches corresponds approximately to the flow into the servomotor.

The fact that the operation of servomechanisms with artificial feedback depends on the continuity of resetting of the reset throttle means of flow stabilizers, which are controlled by small pressure differences caused by the liquid flow through the measuring screen, makes their proper operation easily affected by accidental friction, viscosity variations, and the like. Also, they can easily be vibrated, thereby causing an unstable functioning of the servomechanism. A further disadvantage of the prior servomechanisms is their complexity and the increased pressure losses which are caused by the flow stabilizer.

The object of this invention is to provide a simple and reliable servomechanism with an artificial feedback, nonsensitive to various harmful effects, and providing a relatively stable and easily selectable ratio between the input and output part of the servomechanism.

The servomechanism in accordance with this invention comprises as least one feedback simulator, which comprises the flow meter of the power circuit and controllable throttle means mechanically connected to the latter, incorporated between the control branches of the control circuit.

An illustrative arrangement in accordance with the invention is schematically shown in the accompanying drawings, in which FIG. 1 is a block diagram of a hydrostatic servomechanism with two servopumps and two feedback simulators;

FIG. 2 is a diagram of a hydrostatic servomechanism part with a single feedback simulator;

FIG. 3 is a view in section of an example of the feedback simulator construction; and FIG. 4 is a fragmentary view in section of an example of the simplified construction of the feedback simulator.

Figure 1:
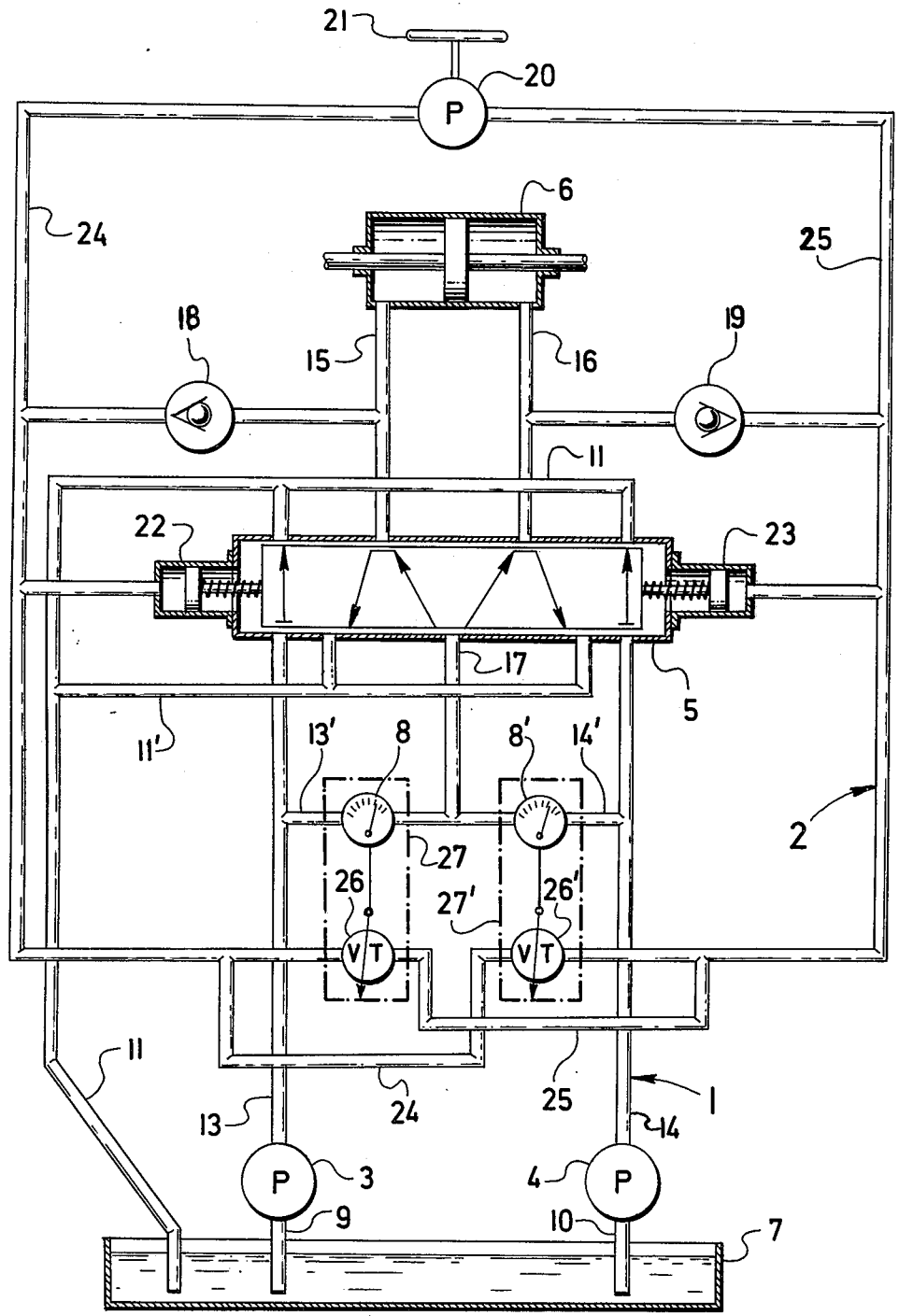

The hydrostatic serovmechanism according to this invention shown in FIG. 1 consists of a power circuit 1 and a control circuit 2. The power circuit 1 is formed by a pair of powered servopumps 3, 4, a distributor 5, a servomotor 6, a tank 7 and two flow meters 8, 8'. The servopumps 3, 4 are connected by suction branches 9, 10 to the tank 7 and by discharge branches 13, 14 to the distributor 5, which is connected by feed branches 15, 16 to the servomotor 6 and to the tank 7 through a waste branch 11. The servomotor 6 is further connected to the not shown working mechanism or device, for example to the mechanism turning the steered wheels of a vehicle. Between the discharge branches 13, 14 and the common supply branch 17 the flow meters 8, 8' are connected through a branching pipes 13', 14'. The flow meters 8, 8' can be any hydraulic elements responding to the flow variation by the continuous variation of the position or form of any of its elements. Non-return valves or slide valves can be used as flow meters, such valves being reset proportionally with the liquid flow by a spring or a diaphragm which are deformed due to the pressure variation caused by increased fluid flow.

The control circuit 2 is formed by a measuring pump 20 actuated by a command element, 21 as for example by a steering wheel and connected to reset mechanisms 22, 23 of distributor 5 by means of the control branches 24, 25 between which the controllable throttle means 26, 26' are incorporated. The controllable throttle means 26, 26' can be any one of a number of adjustable throttle means for the reset through-flow cross-section. The control branches 24, 25 are connected to the feed branches 15, 16 by means of the non-return valves 18, 19. The flow meter 8, 8', which is mechanically connected to the controllable throttle mean 26, 26' forms together a single unit, that is, the feedback simulator 27, 27'. Filling of the control circuit 2 with liquid has not been indicated in the diagram of the servomechanism, since this can be accomplished in any normal way and beside this it is not the object of the invention. Thus for example the control circuit 2 can be filled from the waste branches 11, 11' or the discharge branches 13, 14 or jointly from the supply branch 17 of the power circuit 1, or possibly the filling can be provided by a separate, powered pump and the like.

The servomechanism according to this invention can also have the distributor 5 with an interconnection other than that shown in FIG. 1. For example, the distributor 5 can be modified to be fed by a single servopump 3 only. Then, not only is the second servopump 4 eliminated, but the second feedback simulator 27' is also eliminated. The distributor 5 in its center position, if useful for the operation of the servomechanism, can interconnect all branches mutually, i.e., it can feature the so called "open center". For a servomotor 6 there can be employed a hydraulic cylinder, a hydro-engine, or possibly a group consisting of any combination of these units.

FIG. 2 shows a block arrangement of a part of a hydrostatic servomechanism according to this invention. It has, instead of two flow meters 8, 8' within the branching pipes 13', 14' of the discharge branches 13, 14 and two controllable throttle means 26, 26' between the control branches 24, 25, only one flow meter 8'' interposed in the common supply branch 17 and one controllable throttle mean 26'' between the control branches 24, 25, the flow meter 8'', together with the controllable throttle means 26'', forming the feedback simulator 27''.

The invention can also be realized in a modification, wherein the flow meter 8'' is incorporated within the branching pipe 11' of the waste branch 11 through which the liquid returns from the servomotor 6 into the tank 7.

FIG. 3 shows an example of the construction of the feedback simulator 27, corresponding to the feedback simulators 27, 27' and 27'' in FIGS. 1 and 2. The feedback simulator 27 consists of the flow meter 8 and the controllable throttle means 26 arranged in an insert 31. The flow meter 8 is in the form of a non-return valve 33, pushed against the seat of the insert 31 by a spring 34 resting with its other end against a split ring 35. The non-return valve 33 can have a conical end 36 so that the through flow cross-section is opened slowly, or the stroke of the non-return valve 33 may be sufficiently long. The feedback simulator 27 can be made separately and connected to the relevant parts of the servomechanism by pipings, or it can be built-in the distributor 5.

It is assumed in FIG. 3 that the feedback simulator 27 is mounted in the distributor 5. The controllable throttle means 26 consists of a cylindrical shank 37 connected at its right hand end to the non-return valve 33 and its left hand end passing through partitions 39, 40, 41, which separate the right side cavity 42, the center cavity 43 and the left side cavity 44 a tapered portion 38 of the shank of a conical or wedge form lies within the center cavity 43, part 38 together with the partition 40 forming the controllable throttle means of approximately the same resistances for either dissection of liquid flow. To the right cavity 42 there is connected the control branch 24 and to the center cavity there is connected the control branch 25. (These connections can also be reversed.) The left side cavity 44 is connected as required either through the axial passage 45 in the shank 37 to the common supply branch 17 or through the passage 46 in the left face 12 of the insert 31 to the waste branch 11, so that the volume of the liquid can easily be changed by the displacement of the shank 37. The thickness of the partition 40 is small (approx. 1mm.) so that the hydraulic resistance of the controllable throttle mean is approximately the same in either direction and is independent of the liquid viscosity.

FIG. 4 shows an example of a simplified construction of the feedback simulator 27. This type is mainly applicable where the shank 37 has a small diameter.

The servomechanism according to this invention operates as follows:

When the measuring pump 20 (FIG. 1) actuated by the command element 21, for example a steering wheel, is at a standstill, then the distributor 5 is at the center position in which it interconnects the discharge branches 13, 14 of the pumps 3, 4 to the waste branch 11 and closes the feed branches 15, 16 of the servomotor 6. In the center position of the distributor 5 the servopumps 3, 4 operate in pressure relieved condition, and the position of the servomotor 6 connected to it (not shown) of the control mechanism is arrested.

When the command element 21 together with the measuring pump 20 is rotated to the right, the measuring pump 20 sucks liquid from the control branch 25 and discharges it through the control branch 24 to the reset mechanism 22 of the distributor 5 and resets the distributor 5 to the right proportionally to the supplied volume of the liquid. By displacing the distributor 5 to the right, the feed branch 15 is connected to the common supply branch 17, the feed branch 16 is connected to the branching pipe 11' of the waste branch 11 and at the same time the connection of the discharge branches 13, 14 to the waste branch 11 is closed. Due to this, a portion or the whole liquid supplied by the servopumps 3, 4 flows from the discharge branches 13, 14 through the branching pipes 13', 14' via the flow meters 8, 8' into the common supply branch 17 of the distributor 5 and from the distributor 5 into the left side chamber of the servomotor 6 through the feed branch 15.

The flow meters 8, 8' mechanically control the controllable throttle means 26, 26' and then set them proportionally to the flows passing through them. In this way the connection between the control branches 24, 25, is opened and the liquid supplied by the measuring pump 20 is moved from the discharge control branch 24 into the suction control branch 25. When the rotation of the command element 21 together with the measuring pump 20 is stopped the pressures between the control branches 24, 25 are equalized, and the distributor 5 returns to the center position due to the action of centering springs within the reset mechanisms 22, 23, and the motion of the servomotor 6 is then stopped.

When rotating the command element 21 with the measuring pump 20 to the left, the distributor 5 is reset to the left and the servomotor 6 also moves to the left. The function of the whole servomechanism is identical to that already described for the displacement of parts 20, 21 to the right.

The proportionality between the movement of the command element 21, for example a steering wheel, and the movement of the servomotor 6 is so achieved, that the liquid flow fed by the measuring pump 20 from one control branch 24, 25 into the other control branch 24, 25 is controlled by the feedback simulators 27, 27' in dependence upon the liquid flow passing into the servomotor 6. When the servopumps 3, 4 are inactive, both controllable throttle means 26, 26' remain closed and the liquid from the measuring pump 20, controlled by the driver by means of the command element 21 for example the steering wheel, is according to the direction of rotation either fed from the control branch 24 via the non-return valve 18 into the feed branch 15 or from the control branch 25 via the non-return valve 19 into the feed branch 16. The reverse flow from the servocylinder 6 via the distributor 5 is made impossible, so that the flow meters 8, 8' do not let the liquid pass in the reverse direction. The emergency manual operation of the servomechanism according to the invention is secured in the above mentioned way.

The servomechanism according to FIG. 2 operates in a way similar to the servomechanism according to FIG. 1. The only difference is that all the liquid supplied to the servomotor 6 is measured by a single flow meter 8″ located within the common supply branch 17 and the flow meter 8″ controls only one controllable throttle mean 26″ connected between the control branches 24, 25. The operation of the servomechanism according to this invention can be obtained, when the flow meter 8″ is incorporated in the branching pipe 11′ of the waste branch 11, through which only the liquid returning back from the servomotor 6 into the tank 7 passes.

With the feedback simulator 27 according to FIG. 3 of the invention, due to the resetting of the distributor 5 from the center position to either of the extreme positions a portion or all of the liquid from the discharge branch 13 flows through its branching pipe 13′ into the common supply branch 17 and from here via the distributor 5 into the servomotor 6. At the same time, the non-return valve 33 is lifted from the seat in the insert 31 proportionally to the flowing amount of the liquid and carries with it the shank 37, which by its chamfering 38 provides a connection between the right side cavity 42 and the center cavity 43 and hence of the control branches 24 and 25. The liquid discharged by the measuring pump 20 is displaced around the chamfering 38 of the shank 37 from one into other control branch 24, 25.

By suitable modification of the non-return valve 33 with the conical extreme 36, of the characteristics of the spring 34, and of the shape of the chamfering 38 of the shank 37 the flow between the control branches 24, 25 of the control circuit 2 can be made proportional within a wide range to the fluid flow entering or leaving the servomotor 6. By variation of the conical extreme 36 of the non-return valve 33, the characteristics of the spring 34 and the shape of the chamfering 38 of the shank 37 it is possible freely to alter the ratio between the flow of the measuring pump 20 and the flow of the servomotor 6 and hence to alter the ratio between the input and output part of the servomechanism.

Sufficiently great forces act upon the non-return valve 33 during the operation with regard to small dimensions of the shank 37 and the thickness of partitions 40, 41, 42 to prevent its sticking. At the open position of the non-return valve 33 it is not only the force of the spring 34 acting upon it, but also the force caused by the flowing liquid which push it back onto the seat in the insert 31. The small thickness of the partition 40 insures that the hydraulic resistance of the throttle means does not change due to viscosoty variations and is practically the same for either direction of the liquid flow.

The feedback simulator 27 is operationally very reliable due to its simplicity and particularly due to the direct connection of the flow meter 8 to the controllable throttle mean 26. This property makes possible the use of the invention even on servomechanisms for controlling the direction of vehicles and machines - of so called hydrostatic servosteering devices.

What we claim:

1. In a hydrostatic servomechanism adapted for controlling the direction of vehicles and selfpropelled machines, said servomechanism including a power circuit comprising at least one servopump, at least one servomotor, a distributor and connecting piping and a control circuit comprising a measuring pump actuated by a command element, the control circuit having control branches, and reset mechanism for the distributor, the servomechanism being connected by the control branches to the reset mechanism of the distributor, the improvement which comprises at least one feedback simulator, the feedback simulator comprising a flow meter, a power circuit, and a controllable throttle means mechanically connected to the flow meter, the feedback simulator being incorporated between the control branches of the control circuit.

2. A hydrostatic servomechanism according to claim 1, wherein the distributor is in the form of a valve having an elongated casing and a valve element reciprocable longitudinally within the casing, the reset mechanism is pressure operated, and the valve element is selectively longitudinally positioned by the reset mechanism.

3. A hydrostatic servomechanism according to claim 2, wherein the valve element of the distributor has a passage extending longitudinally therethrough, a spring biased non-return valve in said passage in the valve element and formed by cooperating parts disposed respectively on one end of the valve element and on the valve casing, the valve element having a hollow central shank extending to the other end of the valve element, three serially arranged cavities in the valve casing formed by three axially spaced and centrally apertured partitions in the casing, the shank of the valve element extending through the inner and central cavity, and a frusto-conical portion on the shank extending through the aperture in the central partition and forming a throttling valve therewith.

4. A hydrostatic servomechanism according to claim 1, comprising a plurality of servopumps, each discharge branch of the servopumps having an independent feedback simulator.

5. A hydrostatic servomechanism according to claim 1, wherein the servopumps have a common supply branch, and wherein there is one feedback simulator in each common supply branch.

6. A hydrostatic servomechanism according to claim 1, comprising a branching waste pipe, and wherein there is one feedback simulator in each branching waste pipe.

7. A hydrostatic servomechanism according to claim 3, wherein in the stand still, neutral, position of the distributor the shank of the valve element closes the passage through the apertured central partition.

* * * * *